(12) United States Patent
Zaluska et al.

(10) Patent No.: US 6,342,198 B1
(45) Date of Patent: Jan. 29, 2002

(54) HYDROGEN STORAGE COMPOSITION

(75) Inventors: Alicja Zaluska; Leszek Zaluski; John Olaf Ström-Olsen, all of Montreal (CA)

(73) Assignee: McGill University, Montreal (CA)

( * ) Notice: Subject to any disclaimer, the term of this patent is extended or adjusted under 35 U.S.C. 154(b) by 0 days.

(21) Appl. No.: 09/565,378

(22) Filed: May 5, 2000

Related U.S. Application Data

(63) Continuation of application No. PCT/CA98/00925, filed on Sep. 30, 1998.

(30) Foreign Application Priority Data

Nov. 7, 1997 (CA) .............................................. 2220503

(51) Int. Cl.$^7$ .............................. C01B 3/02; C01B 6/04
(52) U.S. Cl. .................... 423/658.2; 423/647; 423/644; 502/414
(58) Field of Search ................................ 502/400, 414, 502/341; 423/647, 644, 658.2

(56) References Cited

U.S. PATENT DOCUMENTS

| | | | |
|---|---|---|---|
| 4,081,524 A | * | 3/1978 | Ashby |
| 4,368,143 A | | 1/1983 | De Pous Olivier |
| 4,402,933 A | * | 9/1983 | de Pous |
| 4,455,389 A | * | 6/1984 | Lewis et al. |
| 4,576,640 A | * | 3/1986 | Wootton et al. |
| 6,106,801 A | * | 8/2000 | Bogdanovic et al. |

FOREIGN PATENT DOCUMENTS

| | | |
|---|---|---|
| EP | 0 510 918 | 10/1992 |
| WO | WO 96/23906 | 8/1996 |

OTHER PUBLICATIONS

Douglas, D. L. "The formation and dissociation of magnesium alloy hybrides and their use for fuel storage in the hydrogen car" Metallurgical Transactions A (Physical Metallurgy and Materials Science), Dec. 1975, USA, vol. 6A, No. 12, pp. 2179–2189, XP002088735 ISSN 0360–2133.

Patent Abstracts of Japan, vol. 097, No. 003, Mar. 31, 1997 & JP 08 311596 A (Toshiba Corp.), Nov. 26, 1996 see abstract IDEM.

Patent Abstracts of Japan, vol. 010, No. 257 (M–513), Sep. 3, 1986 & JP 61 083489 A (Diesel Kiki Co. Ltd.) Apr. 28, 1986 see abstract, IDEM.

Sandrock, Gary. "A panoramic overview of hydrogen storage alloys from a gas reaction point of view," Journal of Alloys and Compounds, pp. 877–888 (1999).*

* cited by examiner

*Primary Examiner*—Steven P. Griffin
*Assistant Examiner*—Christina Ildebrando
(74) *Attorney, Agent, or Firm*—Swabey Ogilvy Renault

(57) ABSTRACT

A hydrogen storage composition has a hydrogenated state and a dehydrogenated state; in the hydrogenated state the composition comprises a metallic hydride having a metallic component which reversibly forms the hydride and a metallic heat transfer medium in intimate contact with the hydride which transfers heat to the hydride for dehydrogenation; in use hydrogen is liberated from the composition with transfer of heat to the heat transfer medium, the hydrogenated state may be regenerated by exposing the composition in a dehydrogenated state to hydrogen gas. In this way a source of hydrogen gas is provided which source may be regenerated.

16 Claims, 7 Drawing Sheets

FIG_1

FIG_4

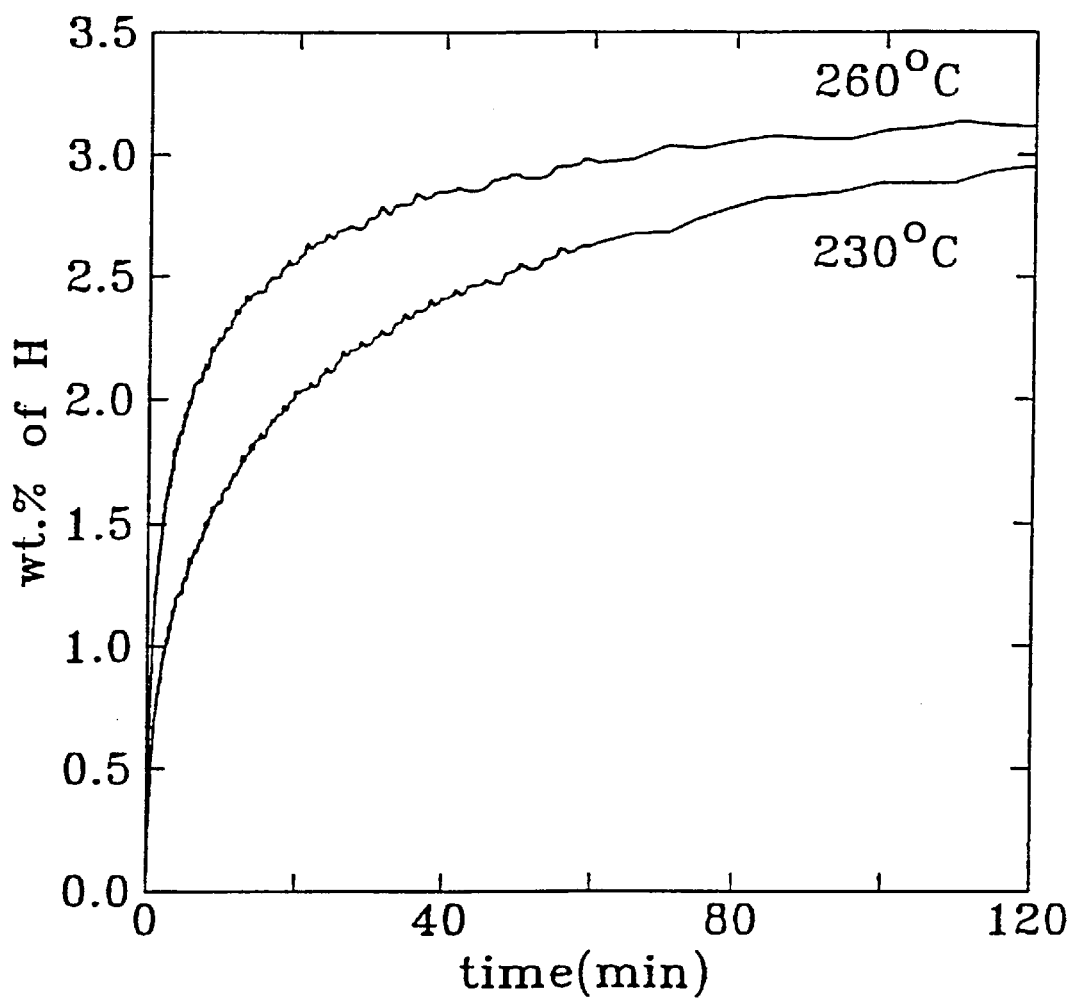
FIG_7

HYDROGEN STORAGE COMPOSITION

CROSS-REFERENCE TO RELATED APPLICATION

This application is a continuation of PCT/CA98/00925, filed Sep. 30, 1998, in which the United States of America was designated and elected, and which remains pending in the International Phase until May 7, 2000.

TECHNICAL FIELD

This invention relates to a hydrogen storage composition, methods for its manufacture and a method of providing a source of hydrogen.

BACKGROUND ART

Although metal hydrides offer a safe and convenient method for hydrogen storage, their practical application as hydrogen carriers still remains limited. This is caused by the fact that most applications require that metal hydrides exhibit in addition the following properties: high hydrogen capacity, fast kinetics of hydriding/dehydriding and suitable ranges of operational pressures and temperatures. Moreover, the hydrides should consist of inexpensive and available elements in order not to excessively raise the cost of hydrogen storage. Although the existing variety of metal hydrides offers a large spectrum of various properties which are suitable for hydrogen storage, so far none of the hydrides fulfills all the requirements. For example, FeTi or LaNi$_5$ can operate at room temperature at reasonable hydrogen pressures, but their low hydrogen capacity in practice excludes the use of these hydrides in transportation, or in portable hydrogen storage containers. V—Ti-based materials exhibit higher hydrogen capacities (up to 2 wt. %), but their cost is too high for any large-scale application.

Magnesium and magnesium-based alloys are the prime candidates for hydrogen storage amongst the existing metal hydrides. Magnesium forms a hydride (MgH$_2$) which provides very high hydrogen capacity which at 7.6 wt. % is the highest of all metal hydrides with reversible performance. Additionally, the enthalpy of the hydride formation is large at 75 kJ/mole, which makes magnesium attractive for thermal energy storage. These features, combined with the very low cost and abundant accessibility of magnesium, suggest an excellent potential for hydrogen-related applications. However, to date magnesium hydride has been of no use for practical hydrogen storage because the reaction of hydriding/dehydriding is very slow and can be performed only at very high temperatures. In practice MgH$_2$ cannot be formed at ambient conditions, and high temperature and high hydrogen pressure are required for the reaction to occur. Moreover, the reaction of hydrogenation is usually blocked by surface oxidation of the material. In order to overcome this problem magnesium has to be activated prior to hydrogenation. Effective activation of magnesium as, for example, in [1] consists of several cycles of annealing at 400° C. in vacuum and in hydrogen, followed by annealing for several hours at 400° C. in vacuum. However, even after such activation, hydrogenation at a temperature of 350° C. and at a hydrogen pressure of 30 bars was not sufficient to initiate formation of magnesium hydride within 48 hours of annealing [1]. In practice, in order to achieve absorption rates for magnesium of the order of hours, the hydrogenation temperature should be higher than 400° C. at a hydrogen pressure of at least 30 bars [2, 3]. In addition, magnesium has a low equilibrium pressure of desorption and therefore desorption of hydrogen from magnesium hydride has to be performed also at very high temperatures, usually 350°–400° C.

An additional important feature of metal hydrides is that the reaction of dehydrogenation has an endothermic character. On one hand, this is very advantageous because it provides safety in the use of metal hydrides. In order to initiate desorption, the heat of the reaction has to be delivered to the system. Therefore desorption of hydrogen from the hydride can be performed with full control, avoiding excessive, uncontrollable production of free hydrogen. On the other hand, however, this feature poses important technical problems. In practice, the rate of hydrogen desorption can be significantly reduced by the very poor thermal conductivity of the hydride. In order to overcome this problem several technical solutions have been proposed, which in general involve improvement of heat transfer by designing special reaction beds [4, 5, 6].

Efficient metal hydride beds have various types of heat-transferring media incorporated into the bed. In practice, such media could be, for example, a heat sink in the form of rods, plates, wires or foams, made of a material with excellent thermal conductivity, for example, copper, aluminum or graphite. Such a heat sink, or a binder, or conductive matrix, can significantly increase the rate of the hydriding/dehydriding reaction. However, the resulting enhancement in the reaction kinetics is achieved always at the cost of the effective hydrogen capacity. The total weight of the reaction bed, including binders or heat sinks, increases substantially and the effective hydrogen capacity is in practice significantly reduced.

In response to the above drawbacks of metal hydrides, the present invention addresses simultaneously both problems: performance of metal hydride and heat-transfer limitations. As a result a viable metal hydride system is obtained, with high hydrogen capacity, fast performance and low cost.

DISCLOSURE OF THE INVENTION

It is an object of the invention to provide a hydrogen storage composition.

It is another object of the invention to provide a method of producing a source of hydrogen gas.

It is a further object of the invention to provide methods of producing the composition of the invention in the hydrogenated state.

In one aspect of the invention there is provided a hydrogen storage composition having a hydrogenated state and a dehydrogenated state, wherein (a) in said hydrogenated state said composition comprises (i) a metallic hydride having a metallic component which reversibly forms said hydride, and (ii) a metallic heat transfer medium in intimate contact with said hydride and effective to transfer heat to said hydride for dehydrogenation of said hydride, and (b) in said dehydrogenated state said composition comprises (iii) at least one intermetallic compound of said metallic component of said hydride and said metallic medium.

In particular, in the hydrogenated state, the hydride and the metallic medium are in fine particle form, preferably composed of particles having a size below 10 microns, more preferably below 100 nanometers, still more preferably below 50 nanometers and especially below 10 nanometers.

In another aspect of the invention there is provided a method of providing a source of hydrogen gas comprising liberating hydrogen from a composition of the invention as described above, at an elevated temperature, with transfer of heat to said hydride by said metallic heat transfer medium, removing said liberated hydrogen and regenerating said hydrogenated state by exposing said dehydrogenated state to hydrogen gas.

In other aspects there are provided methods for producing a composition of the invention.

In one embodiment of the latter aspect of the invention the method comprises mechanically alloying, rapidly solidifying or casting an intimate mixture of a metallic component which reversibly forms a metallic hydride and a metallic heat transfer medium, and hydriding said mixture with formation of the hydride of said metallic component while maintaining said metallic medium in non-hydrided form.

In another embodiment the method comprises mechanically alloying, rapidly solidifying or casting an intimate mixture of a metallic hydride having a metallic component which reversibly forms said hydride and a metallic heat transfer medium.

In still another embodiment the method comprises mechanically alloying, rapidly solidifying or casting an intermetallic compound of a metallic component which reversibly forms the metallic hydride and a metallic heat transfer medium and hydriding said intermetallic compound to form a hydride of said metallic component while maintaining said metallic medium in non-hydrided form.

DESCRIPTION OF PREFERRED EMBODIMENT

The essence of the invention is that a heat-transfer medium which forms a heat-conducting binder or matrix, is made an integral part of the metal hydride system and plays a crucial role as a reagent in the hydrogenation/dehydrogenation reaction.

In the hydrogenated state of the system, the binder or matrix does not form a hydride but remains in a metallic state, thus preserving its excellent thermal conductivity. In the desorbed state, however, the binder or matrix undergoes a reaction with the basic metal component of the hydride. As a result of this reaction, both thermodynamic and kinetic properties of the main metal hydride are changed and a much better hydriding/dehydriding performance is obtained. The sequence of changing role by the binder or matrix is repeated in subsequent reversible cycles of hydrogenation and dehydrogenation of the system.

The metal hydride component in the system is suitably magnesium hydride. Magnesium hydride provides very high hydrogen capacity, having the highest reversible capacity of all metal hydrides, moreover, it is inexpensive and abundant, although normally magnesium hydride exhibits kinetic and thermodynamic limitations, as described above.

Aluminum is the preferred heat-transfer medium. Aluminum has an excellent thermal conductivity and is recognized as one of the best heat-transfer media, along with copper. As a binder or matrix aluminum does not play an active role in hydrogenation of metal hydrides, since it does not form reversible aluminum hydrides.

Generally the proportions of the metal of the metal hydride, and the heat transfer medium are such that the intermetallic compound or compounds formed in the dehydrogenated state exploit the total content of the two metals, with there being no free metal. In general there is employed 40 to 70%, preferably 45 to 65% of the metal hydride, for example, magnesium and 30 to 60%, preferably 35 to 55% of the heat-transfer medium, for example, aluminum to a total of 100%.

In the hydrogenated state, the system consists of two components, for example, $MgH_2$ and $Al$, which are in physical contact, for the preferred case in which the hydride is magnesium hydride and the heat transfer medium is aluminum. During endothermic desorption of magnesium hydride, aluminum acts simply as a heat-transfer medium. For the desorption, i.e. for the dissociation of $MgH_2$, a significant amount of heat has to be provided. The presence of aluminum plays a substantial role in speeding up this process, because $MgH_2$ is a very poor heat conductor and alone cannot be sufficiently effective in heat transfer.

After the desorption is completed, the problem of heat-transfer is much less significant. In fact, it is even the opposite: slower heat removal from the absorbing material actually enhances the absorption reaction because it occurs at effectively higher temperature. Moreover, the metal of the metal hydride is at this stage in the metallic form and has much better thermal conductivity. Therefore, the role of the binder or matrix is less important for hydrogen absorption.

After the hydrogen desorption stage of the hydrogenation/dehydrogenation cycle i.e. after hydrogen desorption from $MgH_2$, the aluminum changes its role. After the desorption, aluminum is not just a binder or matrix any more, but becomes an integral part of the system and a crucial reagent. The key point is that after the dissociation of $MgH_2$, magnesium does not regain its elemental form, according to the dissociation reaction:

but instantly reacts with aluminum to form distinct magnesium-aluminum phases.

Formation of Mg—Al phases is the basic difference between the present invention and the common situation when the binder or matrix and metal hydride remain separate and do not chemically interfere over the whole hydrogenation/dehydrogenation cycle. Moreover, the reaction in the present case changes the thermodynamic and kinetic properties of the system and the performance of the hydride is substantially improved.

Thus, the present invention proposes a new approach to the problem of heat transfer in the reaction bed of metal hydrides. Instead of a foam, binder or matrix acting solely as a heat sink in the reaction bed, a heat-transfer medium is introduced as an integral and crucial part of the metal hydride system. The heat transfer medium acts as a common heat sink, but only at a certain stage of the hydrogenation/dehydrogenation cycle, i.e., after absorption of hydrogen. In addition, the heat transfer medium acts as an important reagent in the desorbed state and changes thermodynamic properties of the system. As a result, the system exhibits very fast kinetics of absorption and desorption at medium temperatures, in contrast to the conventional magnesium hydride. In this way most problems of the metal hydride performance are practically solved: the problem of heat transfer in the hydrogenated state, slow kinetics and high temperature operation.

The system takes advantage of high capacity as a result of high content of $MgH_2$, and at the same time the presence of Al gives improved heat-transfer and modified hydrogenation properties. When taking into account the hydrogen capacity of the metal hydride system including the heat transfer medium, the system of the invention provides the record weight capacity of all practical hydrides, with a total, reversible hydrogen content of 3.5–4.5 wt. %.

a) Chemical Composition of the System

The reaction between magnesium and aluminum requires first of all that the amounts of both elements in the system allow for the formation of Mg—Al phases. According to the phase equilibrium diagram (Binary Alloy Phase Diagrams, ed. American Society for Metals, Metal Park, Ohio, 1986, Vol. I, p. 129) there are several phases in the Mg—Al system: β-($Al_3Mg_2$), γ-($Mg_{12}Al_{17}$), R-phase. The R-phase (often designated ε) is of composition 42 at % Mg. In addition, several metastable phases were also reported in this system, for example, $Al_2Mg$, $γ^1$-($Al_{12}Mg_{17}$), MgAl. The results show that by changing both the composition and the microstructure of the material, it is possible to form each of the above phases as an intermediate stage of the hydrogenation in an Mg—Al system. In some cases new, unknown phases were formed.

In addition, the reaction occurs not only for a strictly stoichiometric composition. Although the phases are in most cases "line compounds", the applied techniques of material fabrication, described below, may change solid-solubility regions of the phases. Therefore the phases can be formed in much wider composition ranges than these predicted from the phase-equilibrium diagram.

The reaction product does not have to be a single-phase material. For certain compositions in the Mg—Al system, the reaction product can consist of two or more phases with either stable or metastable character. Such a multi-phase material exhibits an accordingly modified hydrogenation behaviour, for example, a multi-stage character of the plateau of equilibrium pressure. However, even in the multiphase material the role of aluminum as a heat-transfer medium remains unaffected, since the whole amount of aluminum is always used as a binder in a hydrogenated state, independently of the phase composition.

If the content of Mg is higher than that necessary for the formation of the respective Mg—Al phases, an excess amount of unreacted Mg is present after desorption. In such a case Mg can still be active in the hydrogenation/dehydrogenation process, but its hydriding properties are not affected by the reaction with Al.

b) Microstructure

Microstructure plays a significant role in the present invention. A key condition for the effective performance is that both magnesium, or magnesium hydride and aluminum are in close proximity, allowing for a fast solid-state reaction upon dehydrogenation. On the other hand, aluminum has to form a network of conductivity paths for effective heat transfer in the absorbed state. Therefore, the optimum microstructure of the system consists of the two phases being in physical contact, with the interface area expanded as much as possible, in order to enhance the reaction rate. In practice, this means that the microstructure should consist of very fine particles or layers of the two phases, Mg or $MgH_2$ and Al. Although relatively good results can be obtained when the two phases are of the size of micrometers, the best performance is obtained when the phases are on the scale of nanometers or tenths of nanometers. In practice, two kinds of microstructures can be equally effective: one consisting of small particles of both phases being in physical contact and the other consisting of particles containing fine precipitates of both phases.

c) Performance

In addition to the great enhancement of heat transfer within the material, the action of aluminum as an integral part of the system changes the whole hydrogenation performance. For some reason, when magnesium is not allowed to form a separate elemental phase after desorption, but reacts instantly with aluminum, the whole process of hydrogenation/dehydrogenation of $MgH_2$ is much faster and can occur at much lower temperatures. Although this phenomenon is not being fully understood yet, some important aspects can be considered.

Hydriding of magnesium with and without the presence of active aluminum is different from both the thermodynamic and the kinetic point of view, and in consequence changes the practical behaviour of the system.

First of all, formation of magnesium hydride exhibits different thermodynamics during the dispropoitionation reaction, i.e., when magnesium comes from the compound, for example, MgAl or γ-($Mg_{12}Al_{17}$), than in the case of hydrogenation of elemental magnesium. Although this phenomenon is not really understood, it is clear that it involves change in the bonding energy of the hydride and in the equilibrium properties of the system. In the case of Mg—Al phases, equilibrium pressure changes significantly. The plateau pressure is shifted substantially towards higher pressures, as compared to pure magnesium hydride. The extent of the change depends on which Mg—Al phase is formed. Results show that the highest value of the plateau pressure occurs in the case of the metastable MaAl phase, for which it was about three times higher than that of pure $MgH_2$ at 280° C. As a result, the system can operate, especially for desorption, at much lower temperatures then the conventional magnesium hydride. Temperature ranges normally inaccessible for magnesium, i.e., below 300°, become viable for the Mg—Al system and the system can effectively operate for both hydrogenation and dehydrogenation at 200°–280° C. Moreover, the reaction is fast, not being retarded by the problems of oxidation and inactive surfaces of the magnesium or magnesium hydride. Formation of $MgH_2$ is somehow much easier when magnesium is taken, possibly in a specific, very active form, from the Mg—Al compound, than from elemental magnesium particles. Therefore, in the present case the rates of both absorption and desorption are significantly higher and activation of the material is not necessary at all, in strong contrast to the conventional magnesium hydride.

d) Methods of Fabrication

The above microstructure can be obtained in many different ways. First of all, a variety of starting materials can be used. In general, the following starting components can give the requires microstructure i) a mixture of magnesium and aluminum;

ii) a mixture of $MgH_2$ and Al; and iii) an already formed Mg—Al phase, stable or metastable.

In each case the best results are obtained when the starting components are in the nanocrystalline form, or the nanostructure is obtained later, in the course of the process, although it is not necessary for the reaction to occur.

There is a variety of methods to be used in order to obtain the right microstructure. Amongst them mechanical alloying or rapid solidification are most suitable, although simple casting could also be effective in production of Mg—Al phases. Ball-milling or grinding of the powders of Mg or $MgH_2$ and Al is very useful in producing the required fine powders of the starting material.

BRIEF DESCRIPTION OF DRAWINGS

FIG. 7 illustrates graphically the rate of hydrogen absorption of the material of FIG. 4.

EXAMPLES

Example 1
Hydrogenation of Conventional Magnesium in the form of Powder

Figure 1:
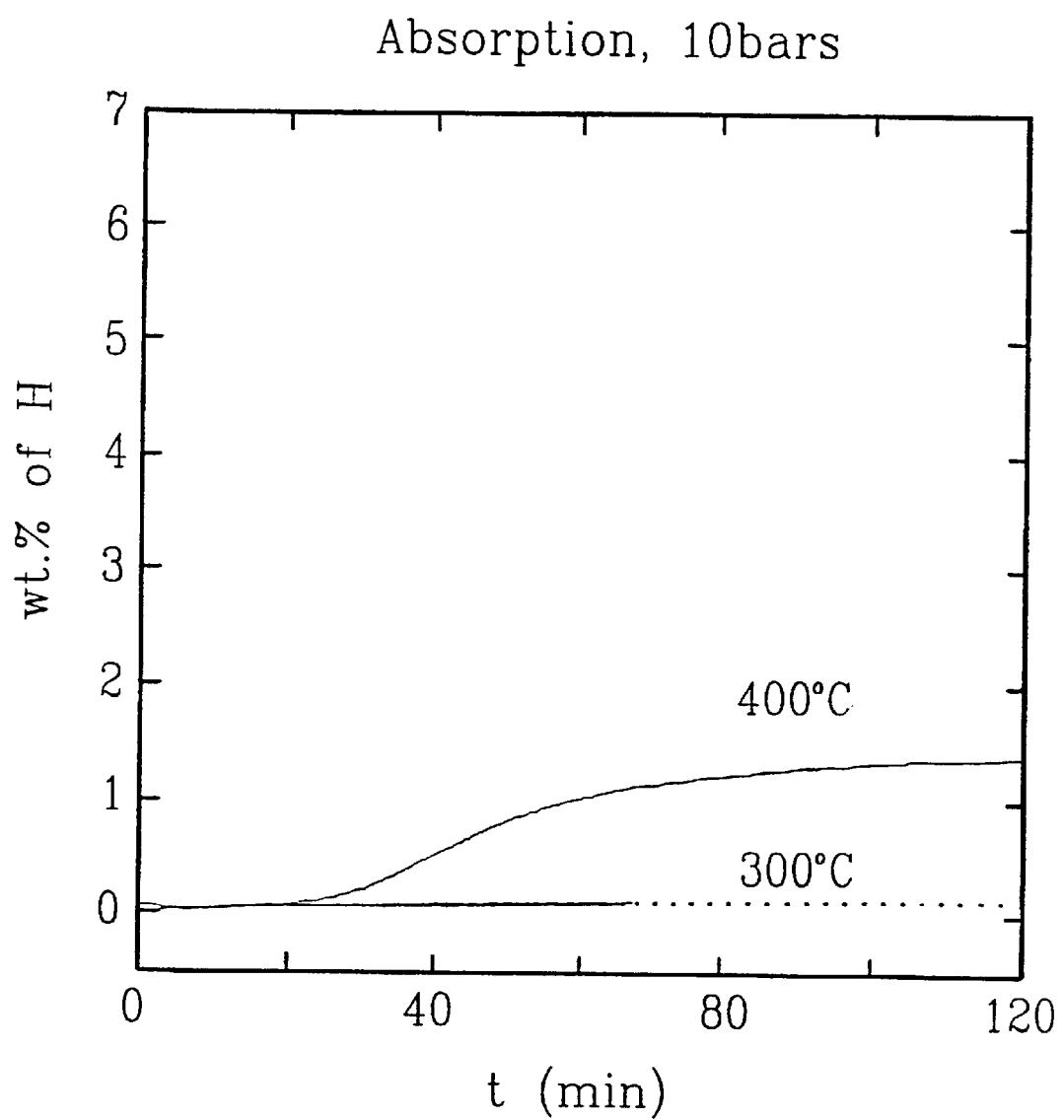
FIG. 1 illustrates graphically the hydrogenation of magnesium.

As can be seen in FIG. 1, conventional magnesium is very difficult to hydrogenate. Normally, at 300° C. absorption of hydrogen in Mg does not occur at all. Even elaborate activation of the material as outlined above does not initiate hydrogen absorption at this temperature. Only at a temperature as high as 400° C. does magnesium start to absorb hydrogen, after activation, although absorption is still very slow and a hydrogen capacity of less than 1.5 wt. % is obtained within the first two hours of hydrogenation.

Example 2
Material in the Absorbed State

Figure 2:
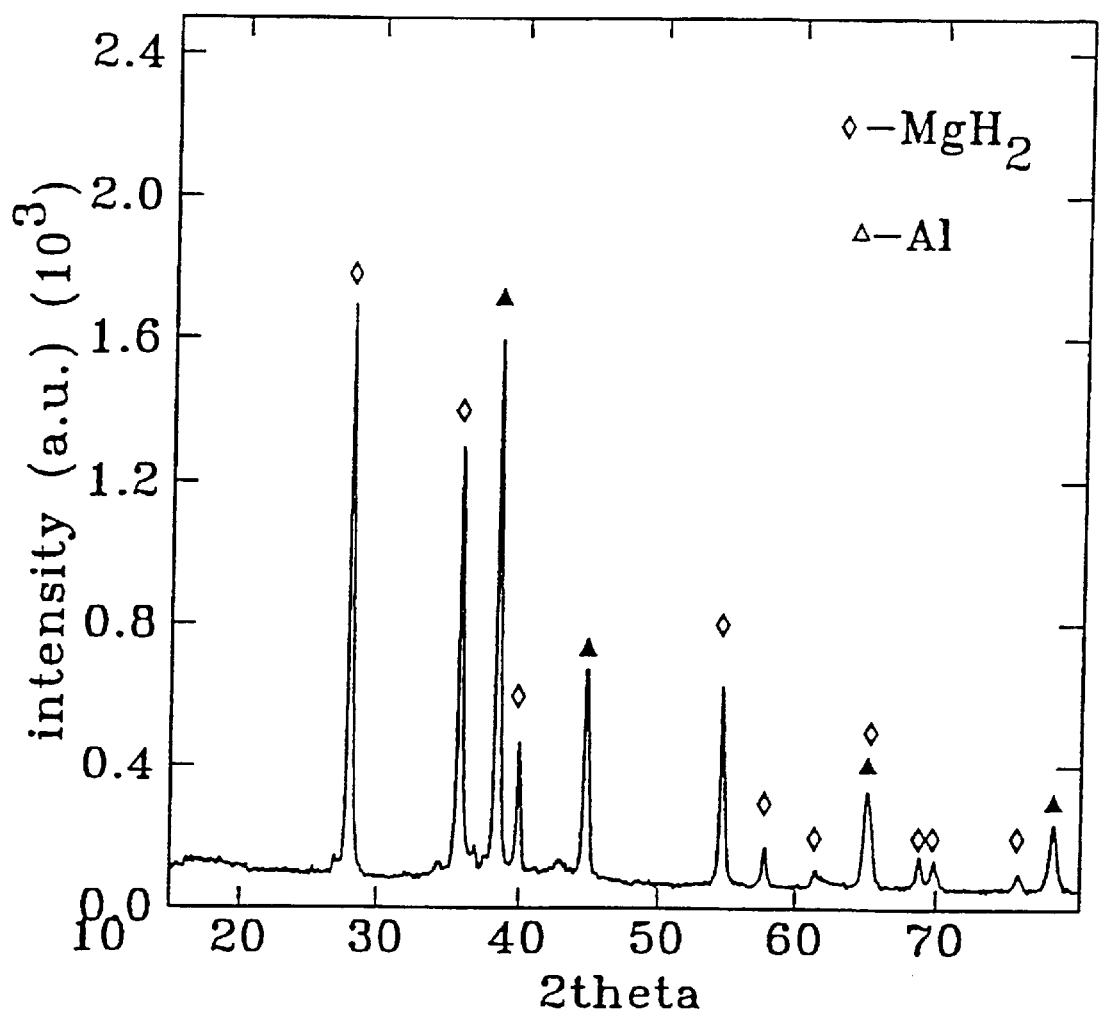
FIG. 2 is an x-ray diffraction pattern of a hydrogen storage composition of the invention in the absorbed state after repeated hydrogenation/dehydrogenation cycles.

FIG. 2 shows the x-ray diffraction pattern of a material of the invention in the absorbed state, after 7 cycles of hydrogenation/dehydrogenation. At this stage of the cycle aluminum acts as a heat-transfer medium for desorption.

The system consists of two phases: $MgH_2$ and Al.

The material was initially prepared by ball milling of the mixture of magnesium hydride and aluminum, in order to form a fine microstructure consisting of small particles of the components. The composition of the material corresponds to 50 at. % of Mg and 40 at. % of Al.

In particular appropriate amounts of the two components $MgH_2$ and Al were sealed under argon in a vial made of hardened steel. Both components were in the form of powders with particle size of less than 100 $\mu$m. The powders were ball milled in a commercial ball mill SPEX 8000 (Trade-mark) or Model SP 2100 (From SCP Science of St-Laurent, Quebec), with steel balls. The process took 12 hours and as a result a mixture of nanocrystalline $MgH_2$ and Al was obtained. In this process of material fabrication no reaction occurred between Mg and Al, only a refinement of the microstructure. As a result, nano-grains of $MgH_2$ and Al are brought into physical contact, thereby enabling fast formation of an Mg—Al phase after hydrogen desorption.

Another series of material was produced starting from Mg and Al, both in a powder form. In general, the smaller the particle size of the starting powder, the shorter the ball milling required for refinement of the material. The best results were obtained when powders of both magnesium and aluminum were already in nanocrystalline form. This was effected by first ball milling the two components alone, followed by ball milling of the appropriate mixture. In this case a solid state reaction occurred during ball milling of the powder mixture, and the respective Mg—Al phases were formed, with very fine microstructure.

Both routes of material preparation gave similar hydrogenation performance, with hydriding kinetics being dependent only on the final grain size of the material. Best results were obtained for the grain size below 100 nm, preferably less than 50 nm.

Example 3
Desorbed State of the Same Material as Described in Example 2

Figure 3:
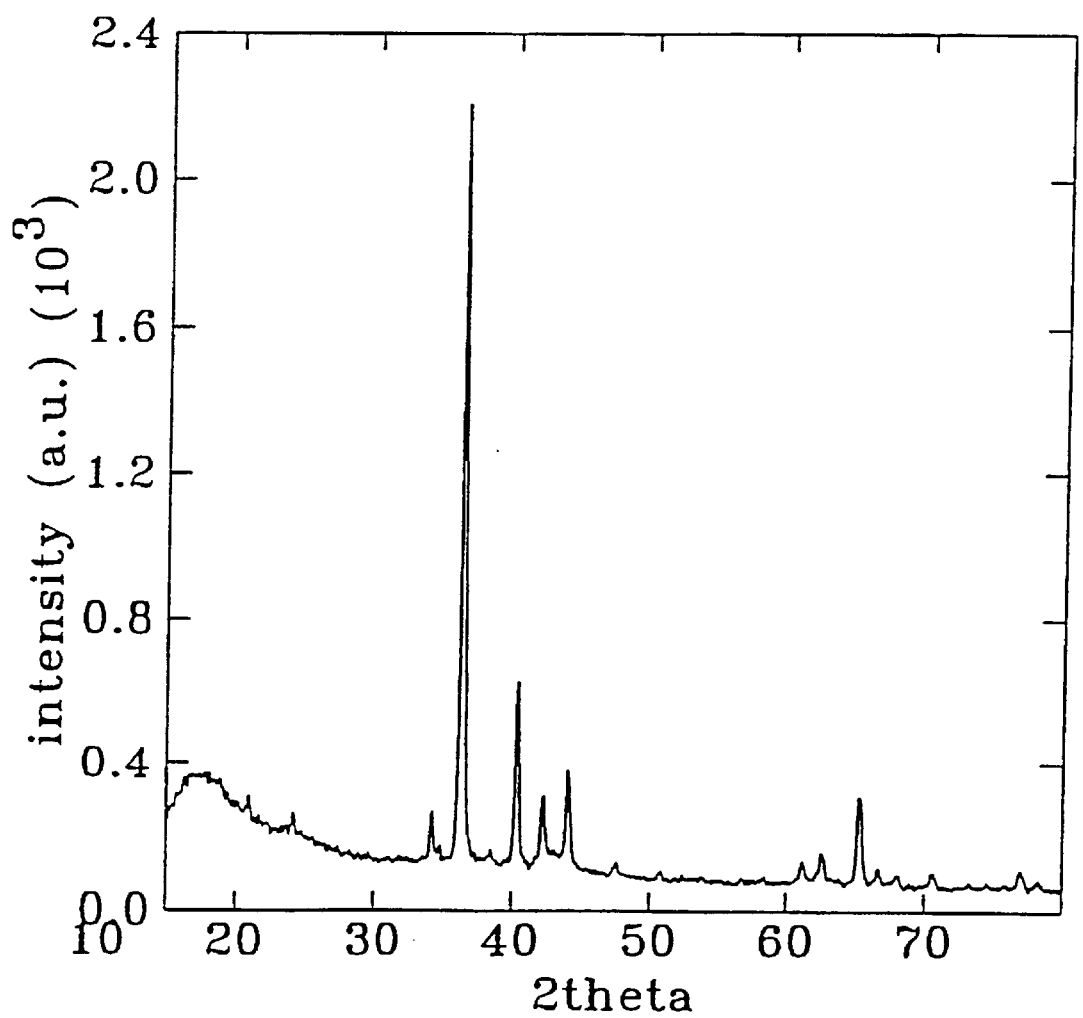
FIG. 3 is an x-ray diffraction pattern of the composition of FIG. 2 in the desorbed state.
Figure 4:
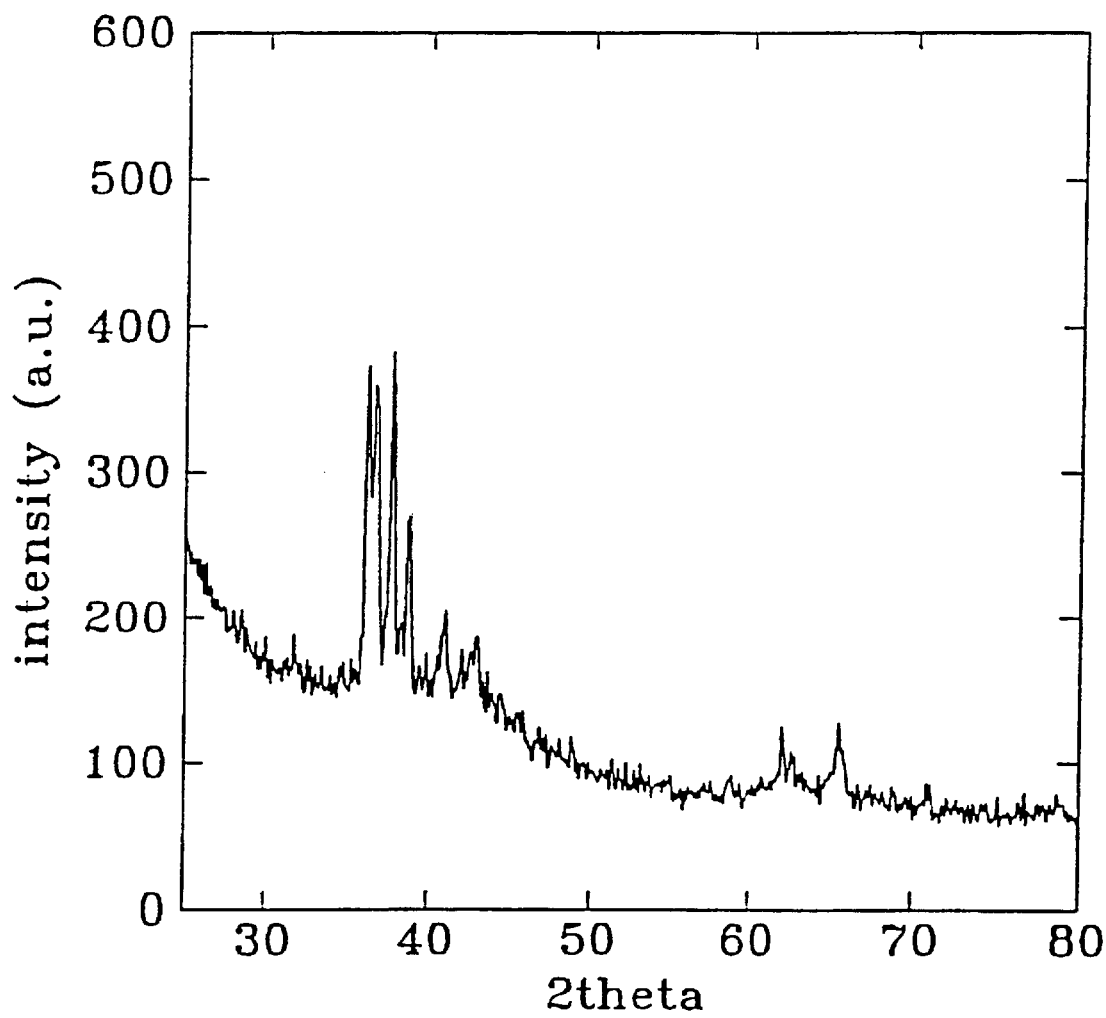
FIG. 4 is an x-ray diffraction pattern in the desorbed state of another composition of the invention.

Instead of the separate Mg and Al phases, a single Mg—Al phase is observed in the x-ray diffraction pattern (FIG. 3). No free magnesium and no free aluminum can be seen and the diffraction pattern can be indexed according to the $\gamma$-phase.

Example 4
Desorbed State of the Material as in Example 3, but with Different Composition In this case the composition corresponds to 50 at. % or Mg and 50 at. % of Al. Instead of the $\gamma$-phase a metastable MgAl phase was formed after desorption of $MgH_2$. The initial fabrication was carried out by the first procedure set forth in Example 2.

Example 5

Figure 5:
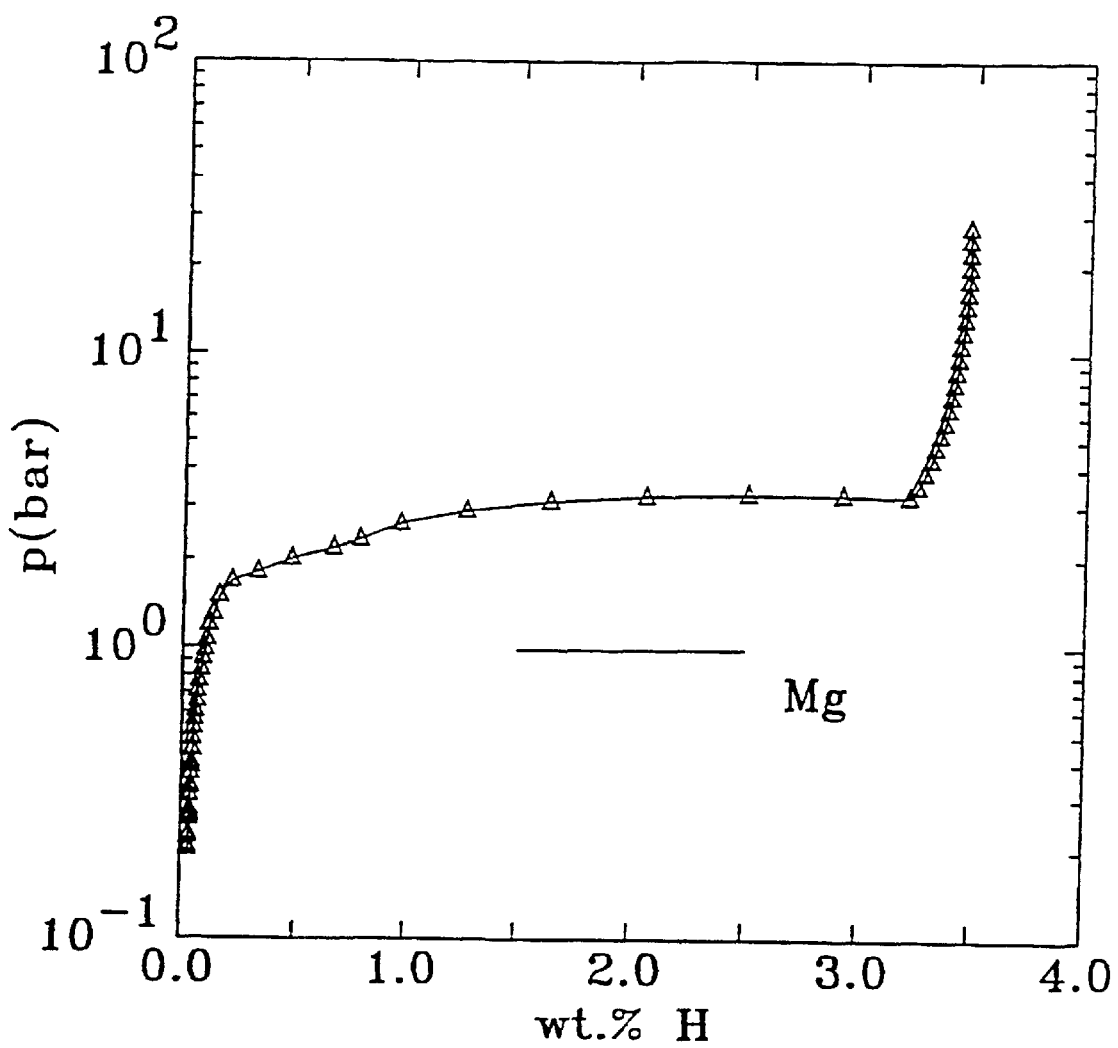
FIG. 5 is a pressure-composition isotherm for the composition of FIG. 4.

A pressure-composition isotherm for the material described in Example 4 is shown in FIG. 5 at the temperature of 280° C. The equilibrium pressure for conventional, pure magnesium hydride is shown for comparison.

Example 6

Figure 6:
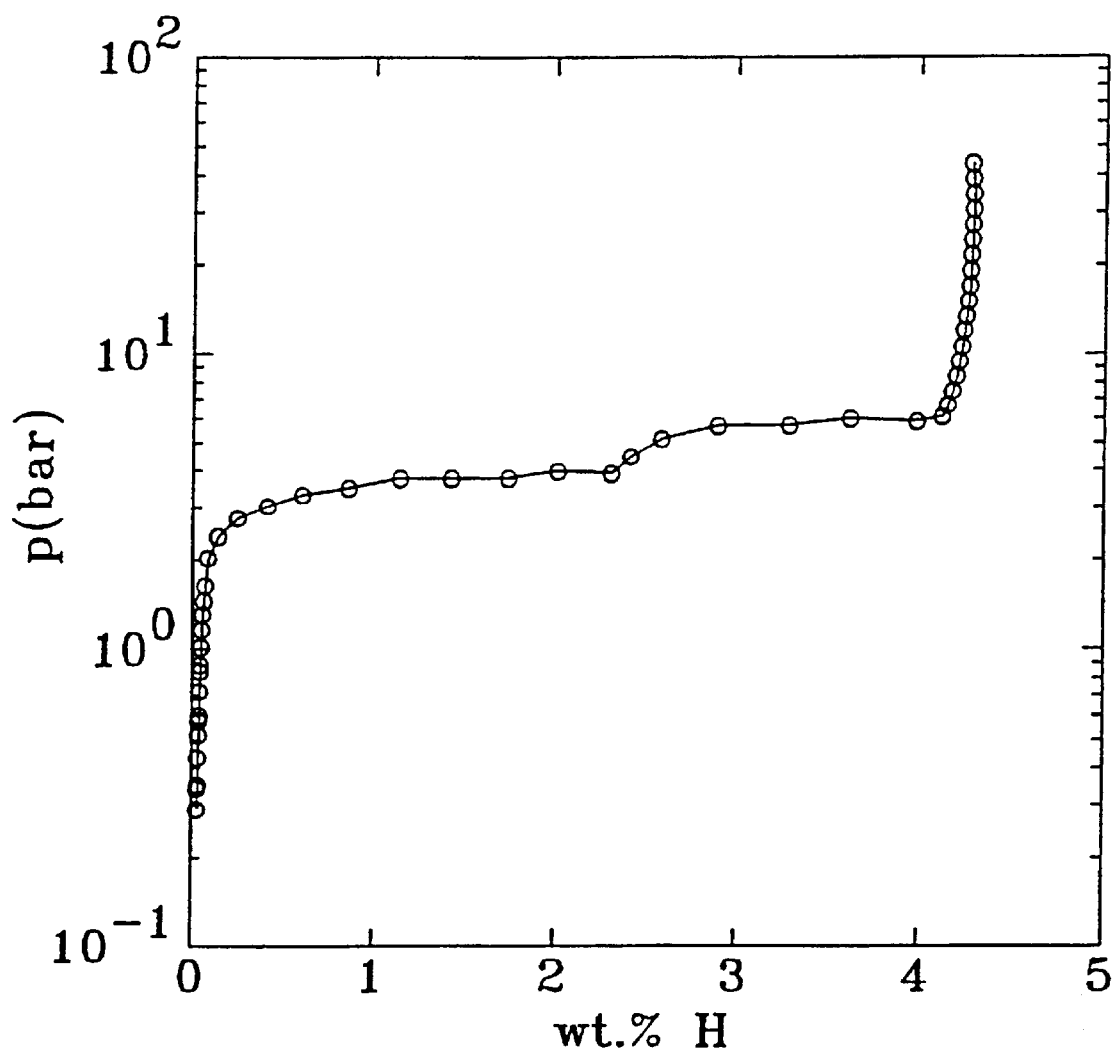
FIG. 6 is a pressure-composition isotherm for another composition of the invention, similar to that of FIG. 5 but with higher Mg content.

A multi-step pressure-composition isotherm for the material with higher Mg content than that in Example 5, at 300° C., is shown in FIG. 6.

Example 7

The rate of hydrogen absorption for the material described in Example 4, at temperatures of 260° C. and 230° C., are shown in FIG. 7.

REFERENCES

[1] G. Liang, E. Wang and S. Fang, J. Alloys and Compounds, Vol. 223, No. 1, p. 111, 1995.
[2] M. Stioui, A. Grayevski, A Resnik, D. Shaltiel and N. Kaplan, J. Less-Common Met., Vol. 123, p. 9, 1986.
[3] C. P. Chen, B. H. Kiu, Z. P. Li, J. Wu and Q. D. Wang, Z. Phys. Chem., Vol. 181, p. 259, 1993.
[4] S. Suda, Y. Komazaki and N. Kobayashi, J. Less Common Metals, Vol. 89, p. 317, 1983.
[5] M. Ron, D. Gruen, M. Mendelson and I. Sheft, J. Less Common Metals, Vol. 74, p. 445, 1980.
[6] J. Topler, O. Bernauer, H. Buchner and H. Saufferer, J. Less Common Metals, Vol. 89, p. 519, 1983.

We claim:

1. A hydrogen storage composition having a hydrogenated state and a dehydrogenated state, wherein
   a) in said hydrogenated state said composition comprises:
      i) magnesium hydride, the magnesium component of which reversibly forms said hydride, and
      ii) of an aluminium heat transfer medium in intimate contact with said hydride and effective to transfer heat to said hydride for dehydrogenation of said hydride, and
   b) in said dehydrogenated state said composition comprises:
      iii) at least one intermetallic compound of said magnesium component of said hydride and said aluminium medium, said at least one intermetallic compound comprising at least one Mg—Al phase; said intermetallic compound exploiting the total metal content of the magnesium component and the aluminium heat transfer medium, there being no free metal and wherein in said hydrogenated state, said hydride and said metallic medium are in fine particle form composed of particles having a size below 10 microns.

2. A composition according to claim 1, wherein said hydrogenated state comprises 40 to 70%, by weight of said magnesium hydride and 30 to 60%, by weight, of said aluminium, to a total of 100%.

3. A composition according to claim 1, wherein said hydrogenated state comprises 45 to 65%, by weight of said magnesium hydride and 35 to 55%, by weight, of said aluminium, to a total of 100%.

4. A composition according to claim 1, in said hydrogenated state.

5. A composition according to claim 1, in said dehydrogenated state.

6. A composition according to claim 1, wherein said size is below 100 nanometers.

7. A composition according to claim 6, wherein said hydrogenated state comprises 40 to 70%, by weight of said magnesium hydride and 30 to 60%, by weight, of said aluminium, to a total of 100%.

8. A composition according to claim 6, wherein said hydrogenated state comprises 45 to 65%, by weight of said magnesium hydride and 35 to 55%, by weight, of said aluminium, to a total of 100%.

9. A composition according to claim 6, in said hydrogenated state.

10. A composition according to claim 1, wherein said size is below 10 nanometers.

11. A composition according to claim 10, wherein said hydrogenated state comprises 40 to 70%, by weight of said magnesium hydride and 30 to 60%, by weight, of said aluminium, to a total of 100%.

12. A composition according to claim 10, wherein said hydrogenated state comprises 45 to 65%, by weight of said magnesium hydride and 35 to 55%, by weight, of said aluminium, to a total of 100%.

13. A composition according to claim 10, in said hydrogenated state.

14. A composition according to claim 10, in said dehydrogenated state.

15. A method of producing a composition in a hydrogenated state, said composition comprising:

i) magnesium hydride, the magnesium component of which reversibly forms said hydride, and ii) an aluminium heat transfer medium in intimate contact with said hydride and effective to transfer heat to said hydride for dehydrogenation of said hydride, said hydride and aluminium medium, in said hydrogenated state, being in fine particle form composed of particles having a size below 10 microns, and said method comprising mechanically alloying, rapidly solidifying or casting an intermetallic compound of a metallic magnesium component which reversibly forms the magnesium hydride and an aluminium heat transfer medium, and hydriding said intermetallic compound to form an intimate mixture of a hydride of said metallic magnesium component while maintaining said aluminium medium in non-hydrided form, said mixture being in a fine particle form composed of particles having a size below 10 microns; said intermetallic compound having at least one Mg—Al phase, said intermetallic compound exploiting the total metal content of the magnesium component and the aluminium heat transfer medium, there being no free metal.

16. A method of producing a source of hydrogen gas comprising:

liberating hydrogen from a composition in a hydrogenated state and said composition:

i) magnesium hydride, the magnesium component of which reversibly forms said hydride, and ii) of an aluminium heat transfer medium in intimate contact with said hydride and effective to transfer heat to said hydride for dehydrogenation of said hydride, said hydride and aluminium medium, in said hydrogenated state, being in fine particle form composed of particles having a size below 10 microns, at an elevated temperature, with transfer of heat to said magnesium hydride by said aluminium heat transfer medium, with formation of a dehydrogenated state comprising at least one intermetallic compound of said magnesium component of said hydride and said aluminium medium, said at least one intermetallic compound comprising at least one Mg—Al phase, said intermetallic compound exploiting the total metal content of the magnesium component and the aluminium heat transfer medium, there being no free metal, removing said liberated hydrogen, and regenerating said hydrogenated state by exposing said dehydrogenated state to hydrogen gas.

* * * * *